Figure 1:
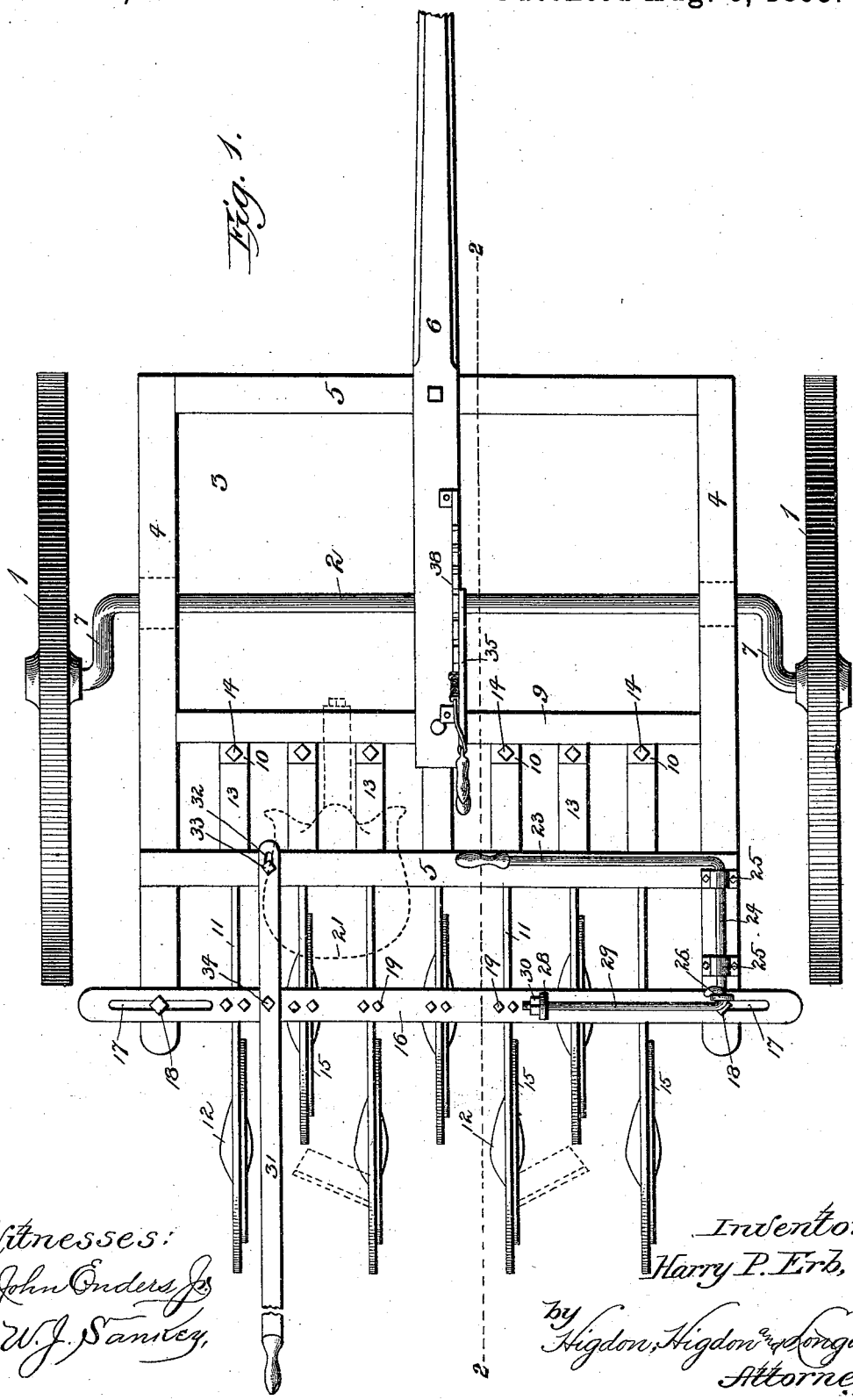

(No Model.) 3 Sheets—Sheet 1.

H. P. ERB.
CULTIVATOR.

No. 502,957. Patented Aug. 8, 1893.

Witnesses:
John Onders Jr.
W. J. Tansey

Inventor
Harry P. Erb,
by Higdon, Higdon & Longan
Attorneys

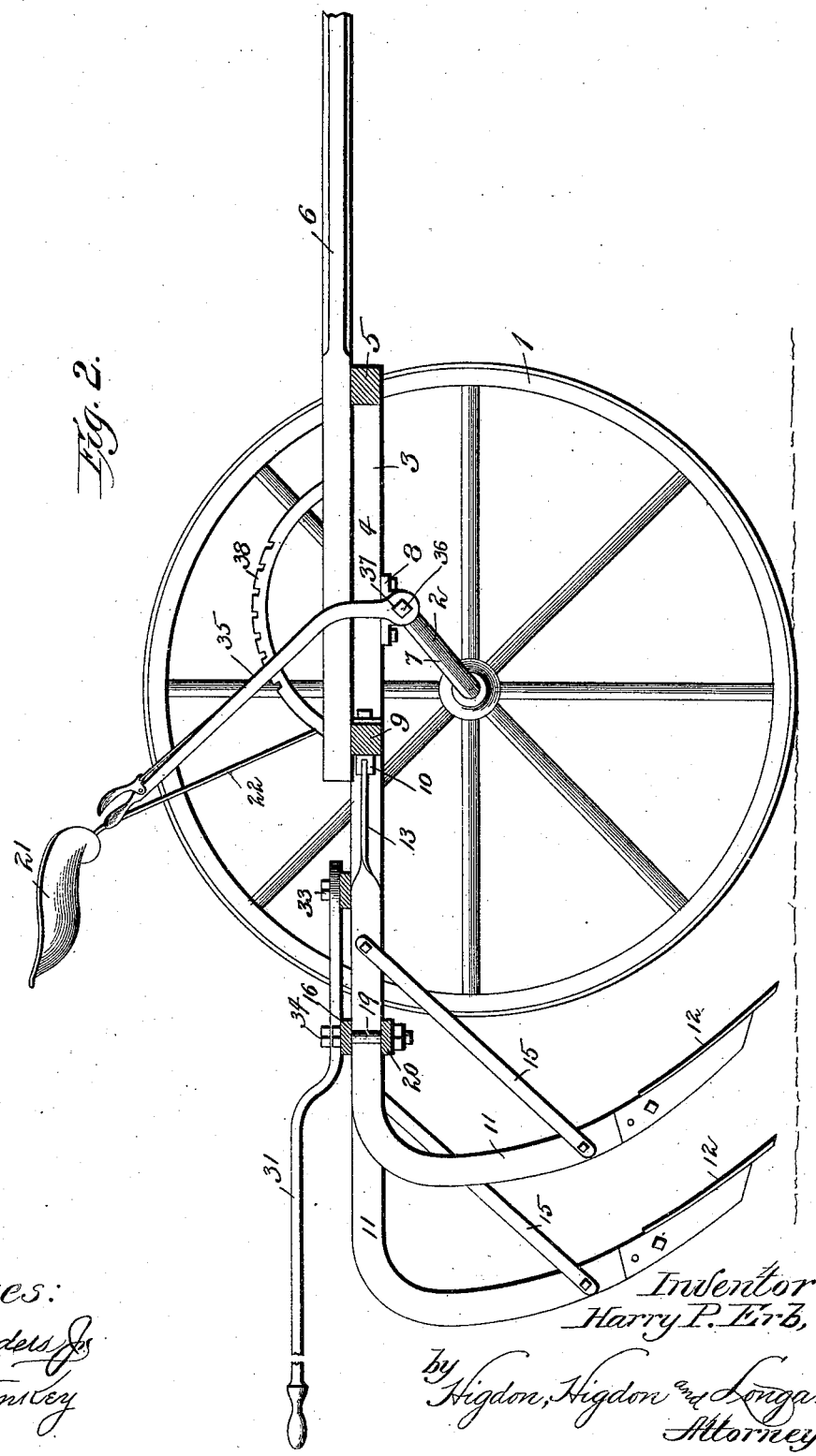

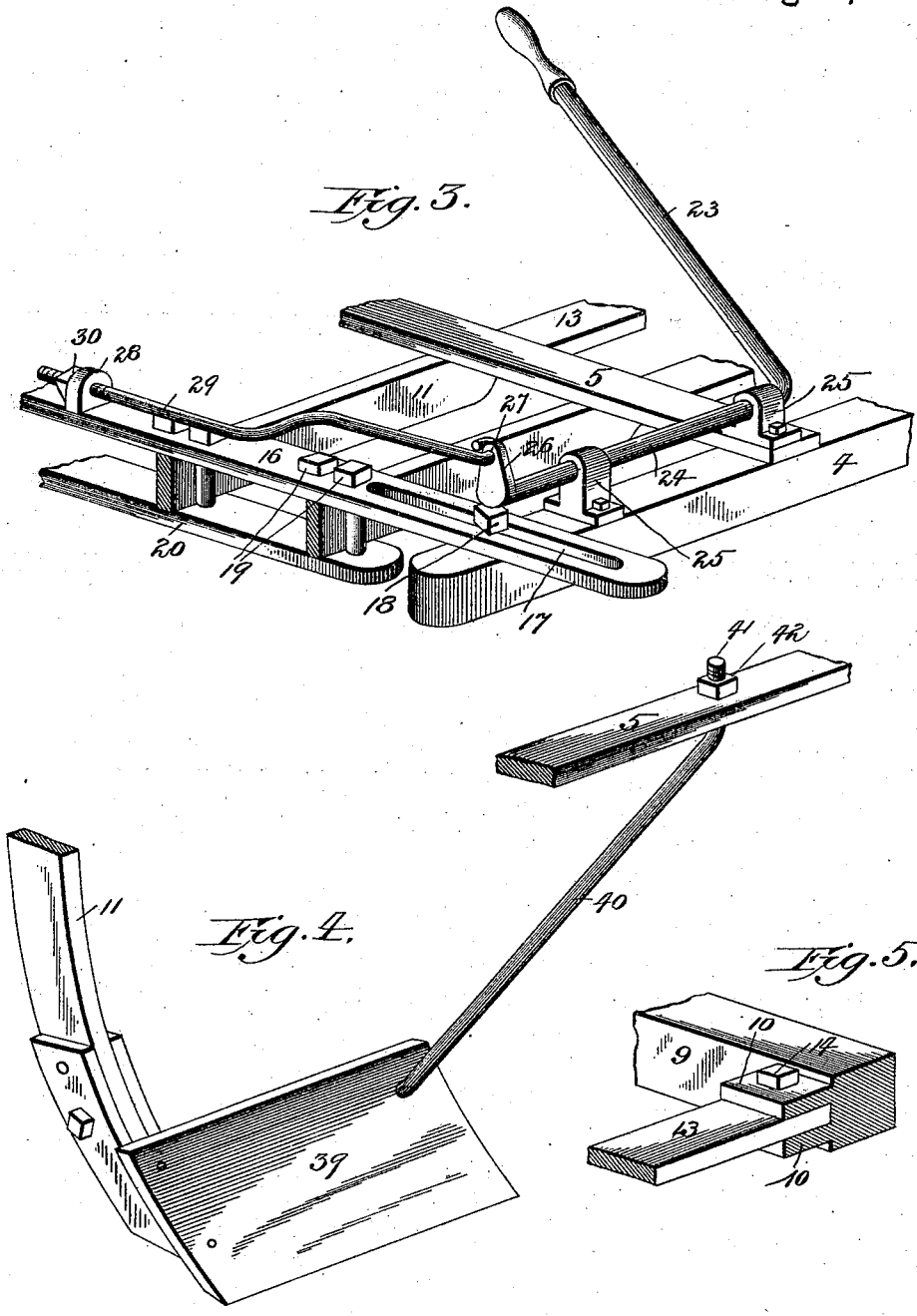

United States Patent Office.

HARRY P. ERB, OF ST. LOUIS, MISSOURI, ASSIGNOR OF ONE-HALF TO JOHN P. BOLIN, OF VANDALIA, ILLINOIS.

CULTIVATOR.

SPECIFICATION forming part of Letters Patent No. 502,957, dated August 8, 1893.

Application filed May 8, 1893. Serial No. 473,374. (No model.)

*To all whom it may concern:*

Be it known that I, HARRY P. ERB, of the city of St. Louis and State of Missouri, have invented certain new and useful Improvements in Cultivators, of which the following is a full, clear, and exact description, reference being had to the accompanying drawings, forming a part hereof.

My invention relates to an improved "agricultural implement" capable of use as a cultivator and plow, and consists in the novel construction, combination and arrangement of parts hereinafter specified and designated in the claims.

In the drawings: Figure 1 is a plan view of an implement embodying my invention. Fig. 2 is a sectional side elevation of same taken on the line 2—2 of Fig. 1. Fig. 3 is a detail view in perspective of the rear right hand corner portion of the machine shown in Fig. 1. Fig. 4 is a detail view in perspective, showing the modified construction. Fig. 5 is a detail sectional view in perspective, showing the manner of pivotally connecting the beams to the frame.

The object of my invention is to provide an improved implement capable of being used as a cultivator or plow, which is simple in construction and operation, very efficient in use and of reasonable cost.

1 indicates the ground wheels, 2 a U-shaped or cranked axle, 3 a rectangular main frame made up of longitudinal bars 4, transverse bars 5 and a pole or tongue 6, all mounted upon said axle. The cranks 7 of the axle are located adjacent the ground wheels and exterior of the main frame.

The axle 2 extends beneath the main frame and is secured in suitable bearings 8 upon the under side of said frame, so as to be capable of a rocking movement in said bearings.

The ordinary doubletree is to be applied to the pole or tongue 6 in operation.

The rear cross bar 5 is fixed to the side bars 4 at some distance from the rear ends of said side bars, so as to leave the same projecting free rearward, so that there is a space formed between said projecting portions.

9 indicates a cross bar extending across the space between the side bars 4 at a point intermediate of the rear cross bar 5 and the front cross bar of the frame and in the rear of the axle 2. Arranged upon the rear vertical face of this cross bar 9 is a series of perforated ears 10, which project rearward from said face in horizontal alignment.

11 indicates a series of shovel or plow beams, each being preferably made of a flat bar of iron with its rear end curved downward and provided with a shovel 12, so that its body has vertical sides in the rear of the cross bar 5. The forward portion of each beam 11 is bent or twisted axially with respect to the body of the beam so that its sides lie in a horizontal plane, and so that each beam is provided upon its forward end with a horizontal flattened head 13.

The horizontal head of each beam is provided with a perforation which is made to register with the perforation in one of the ears 10, and the bolt or like fastening 14 is made to engage the perforations in both ear and head and so pivotally connect said head with said ear, so that each of the beams is pivotally connected to the cross bar 9 at its forward end and capable of being moved laterally at its rear end with respect to the main frame of the machine.

15 indicates braces which are applied to the beams 11 and extend angularly thereon and strengthen the downwardly curved portion which carries the shovel or plow share.

16 indicates an additional cross bar loosely mounted upon the upper sides of the projecting rear ends of the side bars 4. This bar is provided with longitudinal slots 17 adjacent each end which are engaged by bolts 18 and loosely secure said bar in the position described and permit it to have a transverse movement with relation to the said side bars.

At a point in the rear of the flat heads 13 each beam 11 is loosely secured to the sliding bar 16, and spaced a distance apart by means of bolts 19 placed one upon each of the vertical sides of said beams, being passed through the said bar 16 and engaging an additional bar 20 located below and parallel to said bar 16 and secured thereto by said bolts.

My improved implements may be used either in riding or walking.

The ordinary driver's seat 21 is provided with the usual spring 22, and is mounted above the main frame of the machine a little in the rear of the axle, and preferably a little to one side of the rear end of the pole or tongue 6.

23 indicates a hand lever having its upper end free and its lower end secured to the longitudinal shaft or bar 24 mounted in bearings 25 which are secured upon the upper surface of the main frame at one side thereof, preferably the side which is upon the right hand of the driver's seat, and closely adjacent the sliding bar 16. The shaft 24 has a crank 26 formed upon it, and this crank is provided with a perforation 27 adjacent its outer end.

28 indicates a perforated ear projecting from the sliding bar 16, and a connecting rod 29 has one of its ends connected to a perforation 27 in the crank 26 and its opposite end engaging the perforation in the ear 28 and provided with a nut 30.

The hand lever 23 is to be used in adjusting the series of beams laterally when the operator occupies the seat 21 and rides upon the machine.

31 indicates an additional hand lever the forward end of which is provided with a longitudinal slot 32 and is loosely fulcrumed to the rear cross bar 5 by means of a bolt 33 engaging said slot 32 and passing into said cross bar. This lever is pivotally connected to the sliding bar 16 at a point in the rear of the cross bar 5, by means of a suitable bolt or pin 34 passed through said lever and into said sliding bar. This lever extends rearward so that its rear end projects in the rear of the shovels or plows convenient for an operator walking upon the ground in the rear of the machine.

The main frame, and in fact all the parts carried thereby, is mounted upon the axle 2 so as to be raised and lowered bodily by rocking said axle in its bearings.

35 indicates an additional hand lever, which has its lower end fixed upon the axle 2 in any preferred manner, so that when the upper end of said lever is moved backward or forward said axle will be correspondingly rocked in its bearings, and the main frame and all the parts carried thereby will be likewise raised and lowered. I here show the axle provided with a squared portion 36 at a point adjacent the pole or tongue and the lower portion of said hand lever is provided with a corresponding angular socket 37 which engages said squared portion of the axle. Mounted upon the rear portion of the pole or tongue 6 adjacent said hand lever 35 is a notched sector 38 which is adapted to be engaged by ordinary devices carried by said lever to hold the same at the desired adjustment. It will thus be seen that I provide a wheeled implement with a series of shovel or plow beams pivotally connected at their forward ends and spaced apart so that all of the series may be simultaneously moved laterally relative to said frame, either by the operator riding upon the machine or walking adjacent thereto.

In some cases I may detach from the machine any of the series of beams or shovels.

It will be noticed that I here show seven separate beams provided with shovels one of which is located centrally of the machine and three being located upon each side of the central beam. In "laying by" corn the central beam and its shovel may be removed, as may also the shovels 12 carried by the two long beams adjacent said central short beam, and wide plowshares 39 having a transverse width greatly in excess of the said shovels may have one of their ends fitted or secured to the said long beams from which the shovels have been removed, so as to project laterally from said beams, one toward each side of the machine, as indicated by dotted lines in Fig. 1 and the outer free ends of these plow shares 39 are supported and held in proper relative position to engage the earth by means of rods 40 which have one end connected to the free end of said plow shares and their opposite ends connected to either the rear cross beam 5 or the sliding bar 16. These rods 40 extend angularly and have their upper ends 41 screw threaded and provided with a nut 42 above the bar to which they are connected. If desired, instead of removing the small shovels 12 from the said small beams, I may remove said beams altogether and substitute others to which the said wide plow shares are already affixed in the proper manner, and the result will be the same in both cases during operation. The angularly extending rods 40 form a very effective brace or stay for the outer free ends of said wide plow-shares.

The operation is as follows: In "laying by" corn, the machine is made to straddle the rows with the wide plow shares 39 upon each side of a row. When it is desired to throw the shovels 12 to the ground the hand lever 35 is to be thrown forward, out of the position in which it is shown in Fig. 2, and this will permit the straight body of the axle 2 to drop downward, carrying with it all the parts of the machine which are carried by said axle, and causing the shovels to engage the earth the desired distance. When it is desired to lift the shovels, the said hand lever is thrown in an opposite direction from that just described. When it is desired to simultaneously move all of the shovels of the series laterally of the machine, the upper end of the hand lever 23 is thrown inward or out, an inward movement causing the beams and shovels to be moved in a corresponding direction while an outward movement causes said parts to be moved in an opposite direction, the sliding bar 16 sliding upon the cross bar 4 and the flat heads 13 of said beams working loosely upon the ears 10 and the said beams working loosely between the adjacent beams 19 carried by said sliding bar 16. When the operator is walking, the same movements may be accomplished by reaching over to the hand lever 35 and by operating the rear hand lever 31. Upon moving the rear end of the hand lever 31 in one direction the sliding bar 16 is moved in a corresponding direction as are also all of the beams and shovels of the series.

What I claim is—

1. The improved wheeled implement constructed with ground wheels 1, a cranked axle 2, a rectangular main frame made up of longitudinal bars 4, transverse bars 5 and a pole 6 all mounted upon said axle, the cranks 7 located adjacent the ground wheels and exterior of said frame, bearings 8 in which said axle is secured so as to be capable of a rocking movement therein, the rear cross bar 5 affixed to the side bars 4 at some distance from the rear ends of said side-bars so as to leave the same projecting free rearward and a space between said prejecting portions, a cross bar 9 extending across the space between the side bars 4 at a point intermediate of the rear cross bar 5 and the front bar of the frame, a series of perforated ears 10 projecting rearward from the rear vertical face of this cross-bar 9 in horizontal alignment, a series of beams 11 having their forward ends pivotally connected to said ears, a sliding bar 16 loosely-mounted upon the projecting rear ends of the side bars 4 and provided with longitudinal slots 17 adjacent each end, bolts 18 which are loosely engaged by the slot in the sliding bar 16 and loosely secure said bar in the position described and permit it to have a transverse movement with relation to said side bars, each of said beams loosely secured to the sliding bar 16 at a point in the rear of the cross-bar 9, means for sliding the bar 16 transversely of the frame, and means for rocking the axle 2 in its bearings and raising or lowering all the parts carried by said frame bodily, substantially as herein specified.

2. The improved wheeled implement constructed with a main frame 4, ground wheels, an axle upon which said frame is mounted, a series of beams 11 having their front ends pivotally secured to said frame, a cross bar to which each of said beams is loosely secured in the rear of its pivotal-point, a hand lever 23 having its upper end free, a longitudinal shaft or bar 24 mounted in bearings 25 upon the frame and to which the lower end of said hand lever 23 is secured, a crank 26 secured to said shaft, and a connecting rod or bar 29 having one end connected to said sliding bar 16 and its opposite end connected to said crank, whereby said beams may be simultaneously moved laterally of said frame, substantially as herein specified.

3. In a cultivator, a series of beams 11 pivotally connected at their forward ends to the frame of the machine, shovels 12 carried by some of said beams, plow-shares 39 having a transverse width in excess of said shovels, and having their inner ends secured to said beams to project laterally therefrom, one toward each side of the machine, with their outer ends free, a hand lever for moving said shovels and said plow-shares laterally without moving the frame of the machine, rods 40 one end of which is connected to the free end of the plow-shares and the upper ends of which are screw-threaded, and nuts 42 which engage the screw-threaded ends of said rods above a cross-bar of the frame and connect said rods to said bar, substantially as herein specified.

In testimony whereof I affix my signature in presence of two witnesses.

HARRY P. ERB.

Witnesses:
E. E. LONGAN,
JNO. C. HIGDON.